(12) United States Patent
Daniel et al.

(10) Patent No.: US 8,965,425 B2
(45) Date of Patent: Feb. 24, 2015

(54) SYSTEM AND METHOD OF TRANSMITTING CODED MESSAGES USING PROGRAMMABLE ICONS

(71) Applicants: Isaac S. Daniel, Miramar, FL (US); Brian C. Beck, Lake Worth, FL (US)

(72) Inventors: Isaac S. Daniel, Miramar, FL (US); Brian C. Beck, Lake Worth, FL (US)

( * ) Notice: Subject to any disclaimer, the term of this patent is extended or adjusted under 35 U.S.C. 154(b) by 3 days.

(21) Appl. No.: 13/725,830

(22) Filed: Dec. 21, 2012

(65) Prior Publication Data

US 2013/0231144 A1 Sep. 5, 2013

Related U.S. Application Data

(63) Continuation-in-part of application No. 13/532,615, filed on Jun. 25, 2012, and a continuation-in-part of application No. 13/682,676, filed on Nov. 20, 2012.

(60) Provisional application No. 61/580,056, filed on Dec. 23, 2011.

(51) Int. Cl.
H04W 4/00 (2009.01)
H04W 4/12 (2009.01)

(52) U.S. Cl.
CPC .................................. *H04W 4/12* (2013.01)
USPC ........................... 455/466; 455/412.1

(58) Field of Classification Search
None
See application file for complete search history.

(56) References Cited

U.S. PATENT DOCUMENTS

| 2010/0004008 A1* | 1/2010 | Abolrous et al. | 455/466 |
| 2010/0125785 A1* | 5/2010 | Moore et al. | 715/702 |
| 2010/0179991 A1* | 7/2010 | Lorch et al. | 709/206 |

\* cited by examiner

*Primary Examiner* — Erika A Washington
(74) *Attorney, Agent, or Firm* — Carol N. Green Kaul, Esq.

(57) ABSTRACT

The present invention relates generally to a system and method of transmitting coded messages electronically using a wireless mobile communication device to transmit coded messages corresponding to programmable icons and providing for users to create and/or edit their own icons or coded messages.

31 Claims, 10 Drawing Sheets

◉ Post Location — *118*

*116'* 🏠 At Home — *118'*

🏛 At Work — *118"*

*116"*

🔍 Searching

⭐ JustSync Me

💬 Text Me

✉ Send Me Email

❓ Why?

✋ Stop Calling

📞 Call You Back

📱 On A Call

👥 In A Meeting

📹 Video

🎤 Leave a Voice Message

🎧 Listening to Music

📖 Reading

❗ Urgent

♥ Love U

🎭 At a Concert

☁ Outside

⏰ Waiting

✈ On a Plane/Traveling

🌧 Raining

🍜 Lunch

🥤 Let's Have a Drink

✓ Yes

✗ No

*100*

👤 Not Available

👤 Available

👤 Meet Me

🎬 In a Movie

🛒 Shopping

☕ Coffee

👍 I Like It

👎 I Don't Like It

142 — jdoe@email.com
142' — (123) 456-7891
142" — abc@sitework

SYSTEM AND METHOD OF TRANSMITTING CODED MESSAGES USING PROGRAMMABLE ICONS

PRIORITY CLAIM

This patent application is a non-provisional patent application and claims priority to U.S. Provisional Application Ser. No. 61/580,056 titled "Method of Transmitting Coded Messages And Providing For Creating Icons" filed Nov. 23, 2011; and is a continuation-in-part of the following applications: U.S. Non-Provisional Continuation In Part patent application Ser. No. 13/532,615 titled "An Apparatus, System & Method For Transmitting Coded Messages Electronically" filed Jun. 25, 2012; and U.S. Non-Provisional patent application Ser. No. 13/682,676 titled "Method of Transmitting Coded Messages And Providing for Calendaring Responses" filed Nov. 20, 2012. The entire disclosures of the afore-mentioned patent applications are incorporated by reference as if fully stated herein.

FIELD OF THE INVENTION

The present invention relates generally to a system and method of transmitting coded messages electronically using a wireless mobile communication device to transmit coded messages corresponding to programmable icons and providing for users to create and/or edit their own icons or coded messages.

DESCRIPTION OF THE PRIOR ART

Although we are all aware of the dangers of driving and texting, a small minority still persists in engaging in this dangerous practice either out of perceived necessity or fear of missing an important call or message. Many countries have cracked down on this practice enforcing traffic laws by issuing traffic tickets, but still the problem persists. Several mobile communicating devices, e.g. cellular phones, include voice activation options for dialing or answering calls, but not all phones include this option or not all users are fully conversant with this functionality. Notwithstanding, voice activation does not completely solve the underlying problem of trying to communicate a short message to callers in a quick, efficient and safe manner.

Individuals also face similar challenges in varied social settings where protocol dictates that phone conversations are kept to an absolute necessity, e.g. in a meeting or in attendance at a concert. Yet in an effort not to be discourteous, many call recipients choose to answer and quickly acknowledge the caller even though they may not be able to engage in a full blown conversation. Thus, it would be useful to have a system and method of transmitting short coded messages in a quick and efficient manner.

This invention satisfies these long felt needs in a new and novel manner and solves the foregoing problems that the prior art has been unable to resolve.

SUMMARY

A primary object of the present invention is to provide an apparatus, system and method for transmitting coded messages using a mobile communication device that overcomes the limitations of the prior art.

Yet another object of the present invention is to provide a system and method wherein a user may selectively transmit a coded message using any one or more of the programmed icons to transmit a message to one or more electronic addresses for message recipients.

Another object of the present invention is to provide a system and method for sending short coded messages via mobile communication devices using pre-programmed and/or programmable icons.

Yet another object of the invention is to provide the means for users to customize a coded message for a particular icon.

Still yet another object of the invention is to allow users to customize the short coded messages being transmitted to communicate in a language of their choice.

Another object of the present invention is to provide a system and method for adding user-customizable icon creation and editing, which may be executed with an external editor and the image is then imported via an in-app icon creator/editor function within an application program.

Yet another object of the invention is to incorporate user-supplied pictures or graphical images into a custom icon where the photograph or graphical image may be supplied by for example a mobile device's camera to snap, shoot and use simple on-board image editing to create an icon in real-time.

Still yet another object of the invention is to provide for sharing user-created/edited icons among users via social networking, by emails, or app-to-app.

Another object of the present invention is to provide an environment or context sensing and reaction of the coded message app using sensors already inside the host mobile device, such sensors as Global Positioning System ("GPS") receiver, microphone, accelerometer, compass, inclinometer, and the like to detect the environment of the user (call recipient) and generate a responsive coded message. For example, using GPS velocity determination along with microphone detection of road noise to determine that the user is driving, the application may generate suggested coded message icons for display that may be suitable for transmission. The coded message app may generate and display the driving icon such that it grows in size and becomes centralized on the screen, so that if there's incoming transmission, user can initiate the "I'M DRIVING" text reply by simply tapping the driving icon displayed onscreen. In yet another exemplary embodiment, a microphone is activated upon the receipt of incoming electronic communication and by determining the level of the noise and or plurality of voices, types of sounds, e.g. clinking dishes, a responsive icon can be generated, e.g. "I'M EATING" and sent to the incoming caller. In the event however, there is ambiguity concerning two or more possible scenarios, suggested responsive at least one or more icons may appear for user selection.

Another objective of the invention is to allow users to move icons around and to highlight and or otherwise select user's favorites in size, boldness and the like.

Yet another objective of the invention is to keep track of the most-used icons of the user, and highlights those icons, and/or have those icons easily navigable on the mobile communication device's screen.

In some embodiments system and method of communicating comprises of: at least one sensor positioned within a mobile communication device; at least one computer processor in electronic communication with the at least one sensor; an application program comprising of computer executable instructions executable by the at least one computer processor, configured for performing any one or more of the following: receiving at least one sensed element of an environment, as sensed by the at least one sensor and determining at least one icon for publication that corresponds to at least one coded message from the application program suitable for transmission to at least one electronic address based on the at least one element sensed; publishing the at least one icon on the mobile communication's displaying means that corresponds to the at least one coded message; receiving request for transmission of the at least one icon to the at least one electronic address; and converting the at least one icon to a coded message. System and method may further comprise of at least one communication means, in electronic communication with the at least one processor, for transmitting the coded message to the at least one electronic address for the message recipients; displaying means for displaying confirmation of transmission of the coded message and/or a virtual keyboard comprising of a plurality of icons that may be displayed on the at least one displaying means.

For a further and more fully detailed understanding of the present invention, various objects and advantages thereof, reference is made to the following detailed description and the accompanying drawings.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

The following discussion describes in detail an embodiment of the various methods for transmitting coded messages as described below. However, this discussion should not be construed, as limiting the invention to those particular embodiments, as practitioners skilled in the art will appreciate that an apparatus, system and method may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. For definition of the complete scope of the invention, the reader is directed to appended claims. Turning now descriptively to the drawings, in which similar reference characters denote similar elements throughout the several views.

Systems

Figure 1A:
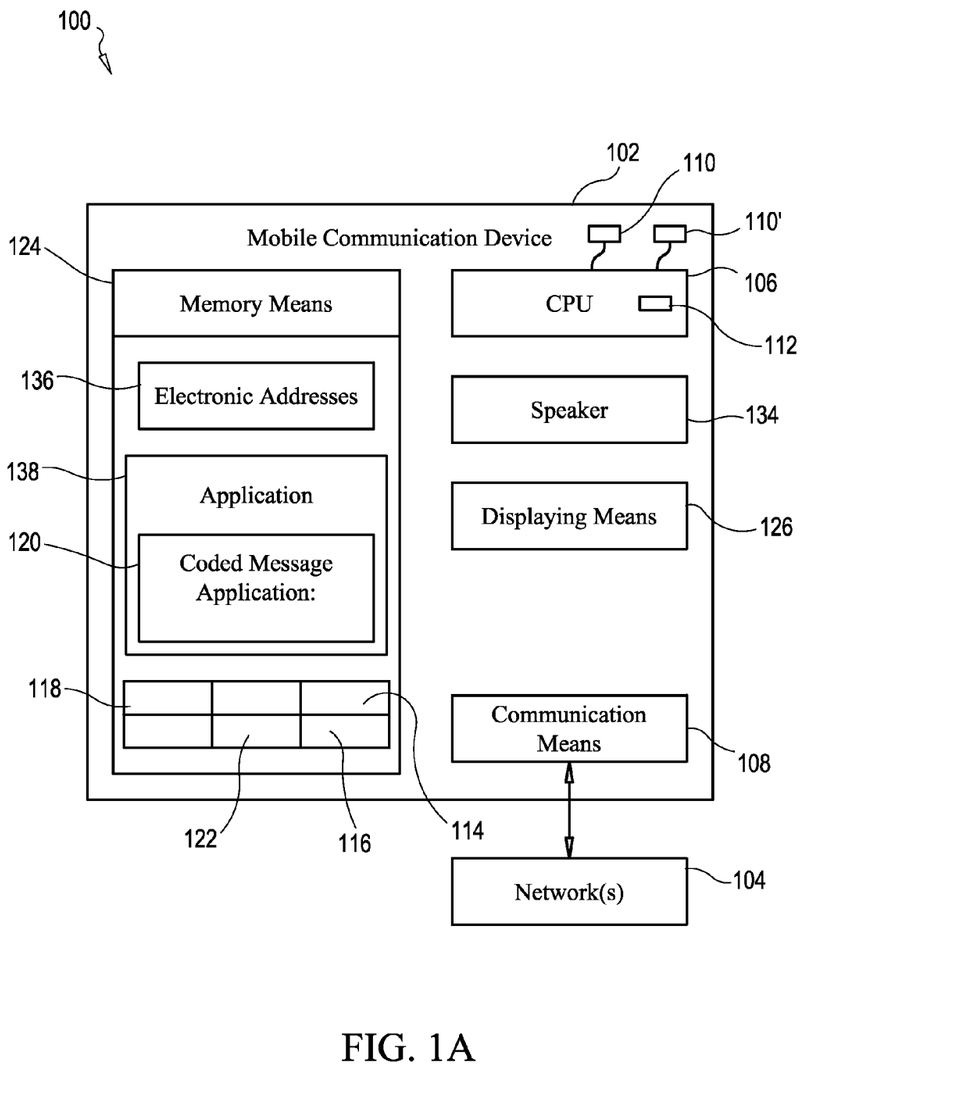
FIGS. 1A-1C are exemplary embodiments of the system according to one embodiment.
Figure 1B:
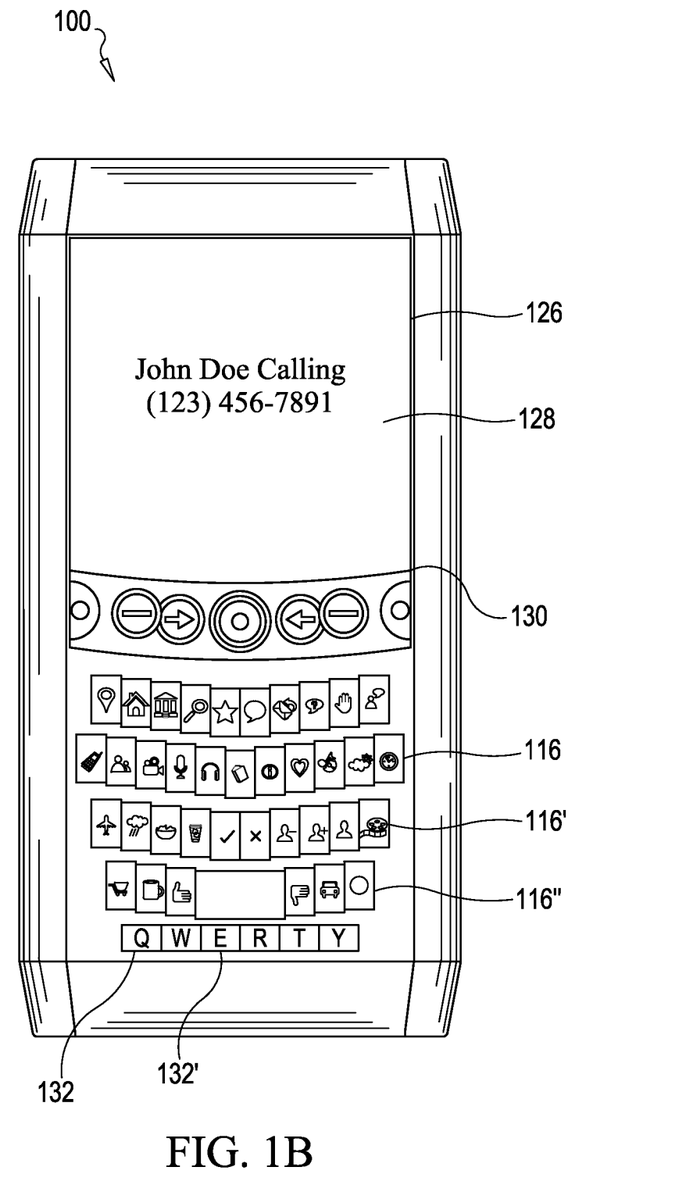

FIGS. 1A & 1B are exemplary embodiments of the system 100 according to one embodiment. System 100 comprises of at least one mobile communication device 102 configured for communicating over a network 104, such as the Internet or a wireless communication network 104, which includes at least one computer processor 106 positioned within, in electronic communication with the at least one mobile communication device's communication means 108 and at least one or more sensors 110 also positioned within the at least one mobile communication device 102; computer executable instructions 112 readable by the at least one processor 106, and configured for performing any one or more of the following: using the at least one sensor 110 to sense at least one element 114 of an environment and to generate publication of at least one or more icons 116, 116' that correspond to at least one coded message 118 from a coded message application program ("coded message app") 120 for transmission to at least one electronic address 122 based on the at least one element 114 sensed; or converting a selected at least one icon 116 to a coded message 118 for transmittal of the coded message 118 to the at least one electronic address 122.

Mobile communication device 102 may be any type of network enabled computerized electronic device configured with means for communicating wirelessly and/or wired with other mobile communication devices 102', 102'', such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network 104, local area network, wide area network such as the Internet, or any other type of network device that may communicate over a network 104.

Computer processor 106 may be any type of processor, such as, but not limited to, a central processing unit (CPU), a microprocessor, a video processor, a front end processor, a coprocessor, a single-core computer processor, a multi-core processor, and the like. Computer processor 106 may be programmed to launch a coded message app 120 for transmitting coded messages 118, 118' to at least one or more electronic addresses 122, 122', 122'. Electronic addresses 122, 122' as used herein may include any one or more of the following: name, telephone number, email address, internet protocol address and social network electronic identifier, e.g. a TWITTER™ handler, and the like. Processor 106 may also be programmed to activate on or more sensors 110, 110' to sense at least one or more elements 114, 114' of an environment and to generate publication of at least one or more icons 116, 116' that corresponds to at least one or more coded messages 118, 118' for transmission to at least one or more electronic addresses 122, 122' based on the element 114 sensed. Sensor 110 includes any one or more of the following: GPS receiver, microphone, accelerometer, compass, inclinometer or other known sensors that are well known and used in the arts. Element 114 as used herein include but is not limited to sound (e.g. noise), variations in speed, acceleration, inclination, direction and the like.

Computer processor 106 is positioned within the mobile communication device 102 and includes computer executable instructions 112 readable and executable by the at least one computer processor 106, where the computer executable instructions 112 are configured to perform all the necessary functions for the system 100 and methods disclosed herein, including but not limited to launching the coded message app 120. Computer executable instructions 112 may be loaded directly on the mobile communication device's processor 106, or may be stored in its memory means 124 such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 112 may be any type of computer executable instructions 112, which may be in the form of a computer program, the program being composed in any suitable programming language or source code, such as C++, C, JAVA, JavaScript, HTML, XML, and other programming languages.

Computer executable instructions 112 are configured to perform any all the necessary functions for the system 100 and methods disclosed herein, which may include any one or more of the following: using at least one or more sensors 110, 110' to sense at least one or a plurality of elements 114, 114' of an environment and to generate publication of at least one or more icons 116, 116' that corresponds to coded messages 118, 118' from a coded message app 120 for transmission to at least one or more electronic addresses 122, 122', 122" based on the at least one or more elements 114, 114' sensed; converting a selected at least one icon 116 to a coded message 118 for transmittal of the coded message 118 to the at least one electronic address 122; launching the coded message app 120 for transmitting coded messages 118, 118' to at least one or more electronic addresses 122, 122', 122"; receiving and publishing notification of an incoming electronic communication from a sender's electronic address 122 on the mobile communication device's displaying means 126; sharing at least one or more icons 116, 116' or at least one or more coded messages 118, 118' with another user of the coded message app 120; tracking user's frequency of use of any one or more icons 116, 116'; enhancing a display 128 of the at least one icon 116 based on tracked use; publishing the at least one icon 116 on the mobile communication device's at least one displaying means 126; receiving at least one icon 116 for transmission to at least one or more electronic addresses 122, 122', 122"; displaying a converted coded message 118 on the at least one displaying means 126; transmitting the converted coded message 118 to at least one or more electronic addresses 122, 122', 122"; or displaying confirmation of transmission of the converted coded message 118; receiving edits to at least one icon 116 or to at least one coded message 118; display a virtual keyboard 130 on the mobile communication device's displaying means 126 comprising of at least one or more icons 116, 116' or alphanumeric characters 132; or store at least one edit for at least one icon 116 or at least one coded message 118.

Memory means 124 may be either electrically or mechanically connected to the at least one computer processor 106. In the case of electronic connections, the electronic connections may be wired and/or wireless connections. Memory means 124 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory means 124 may be used to store information, such as coded message app 120, coded messages 118, 118' including edits to the coded messages 118, 118', electronic addresses 122, 122', favorite icons 116, 116' and the like. Electronic addresses 122, 122' as used herein may include any one or more of the following: name, telephone number, email address, internet protocol address and social network electronic identifier, e.g. a TWITTER™ handler, and the like. Stored information may be retrieved from the at least one memory means 124 using the computer processor 106.

Mobile communication device 102 may include any kind of displaying means 126, such as, but not limited to: a liquid crystal display ("LCD") screen, a light emitting diode ("LED") display, touchpad or touch screen display, and/or any other means known in the arts for emitting a visually perceptible output. Displaying means 126 may include a control means, such as, but not limited to, a touch screen, a stylus, and the like. Mobile communication device's processor 106 is in electronic communication with its displaying means 126. In other embodiments, displaying means 126 is wirelessly connected to processor 106. In some embodiments, displaying means 126 may be electronically connected to a mobile communication device 102 or client device 102' according to the hardware and software protocols that are well known and used in the arts. In some embodiments, mobile communication device 102 also includes a speaker 134 (as is well known and used in the arts) for publishing in audio the coded message 118 being transmitted, edited or saved.

Mobile communication device's computer processor 106 controls its displaying means 126, which is configured for displaying at least one icon 116 on a virtual keyboard 130 (as is well known and used in the arts), wherein the at least one icon 116 corresponds to at least one coded message 118 available for transmission to at least one or more electronic addresses 122, 122'; displaying the converted icon's coded message 118; displaying confirmation of transmission of the coded message 118; displaying a virtual keyboard 130 comprising of a plurality of icons 116, 116' or alphanumeric characters 132, 132', e.g. QWERTY alphanumeric keyboard 130; and/or displaying one or more electronic addresses 122, 122' for receipt of the coded messages 118, 118'.

Mobile communication device 102 may include other hardware components, e.g. one or more communication means 108, either electrically or mechanically connected to its computer processor 106. In the case of electronic connections, the electronic connections may be wired and/or wireless. In some embodiments, communication means 108 may be a wireless communication means 108, which employ short range wireless protocol, such as, but not limited to, a radio frequency transceiver, a radio frequency receiver, and/or a radio frequency transmitter. In embodiments where the wireless communication means 108 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 108 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 108 are operative to transmit or receive electronic communications, i.e. coded messages 118, 118', audio, data, text, pictures, images, and the like via a short range wireless protocol, such as, but not limited to, a radio frequency receiver, a radio frequency transmitter, or a radio frequency transceiver.

Mobile communication device 102 also includes software components, e.g. an operating system ("OS") 136 that manages the hardware resources and other software components, by scheduling the various tasks to be accomplished by the processor 106 or input and output and memory allocation in the memory means 124 and the like. OS 136 acts as an intermediary between programs and the hardware components, and comprises of computer executable instructions 112 to accomplish the various scheduling tasks. OS 136 may comprise of any one of the following operating systems, that may include but is not limited to ANDROID, BSD, IOS, GNU/LINUX, MAC OS X, MICROSOFT WINDOWS, WINDOWS PHONE, and IBM z/OS. In the exemplary mobile communication device 102, OS 136 resides in the memory means 124 as shown in FIG. 1A.

In some embodiments, mobile communication device 102 may have one or more icons 116, 116' or other visual indicators displayed thereon allowing users to launch and access the coded message app 120 whereby when a user selects the launch icon 116 (e.g. by touching a touchscreen, or selecting it using a pointing device, roller ball, arrow keys, or other controller), to access the coded message app 120 for editing the icons 116, 116', coded messages 118, 118' or transmit a coded message 118 to one or more electronic addresses 122, 122' to one or a plurality of message recipients.

System 100 also includes software component, an application program 138 comprising of computer executable instructions 112 readable by the at least one computer processor 106 and configured to control application programs stored on the mobile communication device 102, including but not limited to the coded message app 120. Coded message app 120 may comprise in part of a browser, such as for use on the mobile communication device 102, or a similar browsing device to transmit coded messages 118, 118' to one or more electronic addresses 122, 122' to one or a plurality of message recipients. The app 120 may be any type of software application, such as a standalone application designed to run on a mobile platform, such as a mobile communication device running an operating system, such as iOS™, Android™, Windows Mobile™, Blackberry™, and the like. Coded message app 120 may be operative for an iPhone, any other "smart phone," mobile communication device, cellular phone, PDA, GPS or any other mobile communication device 102 capable of handling transactions dealing with dynamic content, object, application, or software. In another embodiment, the app 120 may be designed to run on a social network platform, such as FACEBOOK™ or JUSTSYNC™ or any other social network website.

In some embodiments, a coded message app 120 may reside on a remote computer server 140 (not shown) and/or on a mobile communication device 102 or client device 102', where the computer server 140 (not shown) may have a software program residing in memory. Mobile communication device 102 may have the coded message app 120 residing in local memory means 124 or the coded message app 120 may be downloadable to the client device 102' from the computer server 140 (not shown). For example, in one embodiment, the coded message app 120 may be on the mobile communication device (such as an iPhone, Blackberry, or other "smart phones") and the full-sized software program may be on the computer server 140 (not shown), where communications may occur over a network 104 or directly, either wired or wirelessly.

The coded message app 120 comprises of computer executable instructions 112' readable by the at least one computer processor 106 and configured to perform any one or more of the following: display at least one icon 116 on a virtual touch-screen keyboard 130 (as are well known and used in the arts); replace a display 128 of a virtual keyboard 130 on the mobile communication device's displaying means 126 that comprises of a display 128 of at least one or more icons 116, 116 or alphanumeric characters, e.g. alphanumeric keys on a QWERTY keyboard as is well known and used in the arts; receiving edits to the at least one icon 116 or the at least one coded message 118; display a virtual keyboard 130 on the mobile communication device's displaying means 126 comprising of at least one icon 116 or alphanumeric characters; store at least one edit for at least one or more icons 116, 116' or the at least one or more coded messages 118, 118'; or display an electronic address 122 for at least one recipient of the at least one coded message 118; display incoming electronic communication 142 (telephone call, SMS text, or data).

Figure 1C:
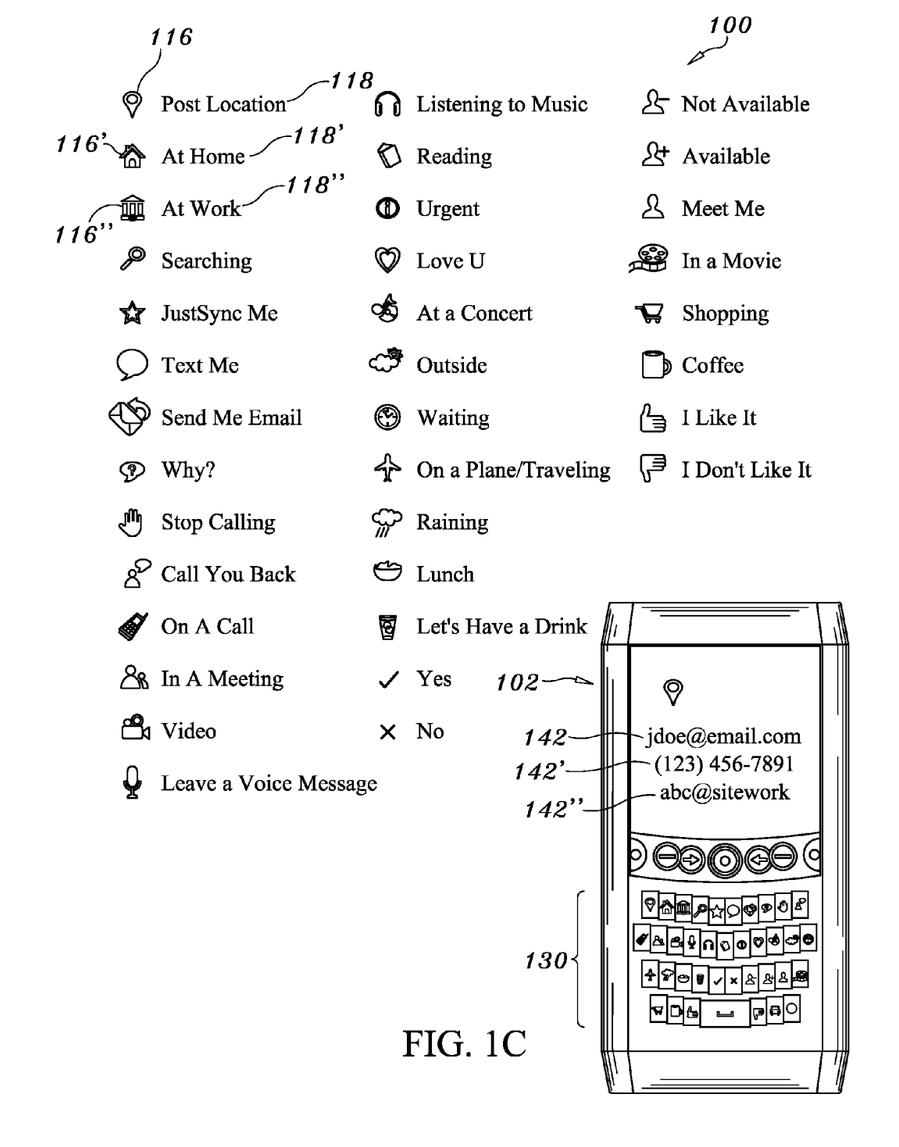

FIGS. 1B-1C are exemplary embodiments of the system 100 according to one embodiment. In some embodiments, once an incoming electronic communication 142 is detected by the mobile communications device's processor 106, the coded message app 120 is automatically launched and triggers the display of a virtual keyboard 130 of varied icons 116, 116', 116" representative of coded messages 118, 118' available for transmission to varied electronic addresses 122, 122', including but not limited to the original sender of the incoming electronic communication 142.

As shown in FIG. 1B, the incoming electronic communication 142 is published via a display 128 on the mobile communications displaying means 126 including a display of the icons 116, 116', 116" for the associated coded messages 118, 118' listed in FIG. 1C, for transmission to one or more message recipients. In some embodiments, the display may also include alphanumeric characters 132, 132' such that the user has a choice of transmitting non-coded messages 118, 118'. The coded messages 118, 118' may be the standard coded messages 118, 118' as included with the app 120 or user customized where the original coded message 118 associated with an icon 116 or the icon 116 associated with the coded message 118 can be edited for a customized coded message 118 and stored for future use in the mobile communications device's memory means 124.

As seen in FIG. 1C, listed are several exemplary icons 116, 116', 116" and their corresponding coded messages 118, 118', 118". A student user for example may for instance customize the icon 116 representative of coded message for "AT WORK" to mean "AT SCHOOL." By saving the edits and storing the changes, user may use the stored customized icon 116 in the future to notify his/her message recipients that he or she is "AT SCHOOL" as opposed to at work. By simply clicking the icon 116 as modified for "AT SCHOOL," processor 106 converts the selected at least one icon 116 to a coded message 118 that may be displayed on the displaying means 126 for transmission to one or a plurality of message recipients. The coded message 118 may also be customized to reflect a language or dialect of the user's choice. In this manner, user can maintain privacy over the coded messages 120 being transmitted as the language or dialect being used only requires the message recipient's understanding of the same.

In some embodiments, system 100 provides for user-customizable icon 116 creation and editing, which may be executed with an external editor where an image may be imported via an in-app icon creator or editor function within the coded message app 120. Images as used herein may include but are not limited to user-supplied pictures or graphical images may be supplied by for example a mobile device's camera to snap, shoot and use simple on-board image editing to create an icon 116 in real-time. Once the image is uploaded it may be customized into a custom icon 116. In an exemplary embodiment, user may upload a photograph or image of a school and edit the icon 116 representative of coded message for "AT SCHOOL" to now be represented or displayed by the customized uploaded image, i.e. photograph of the school.

In some embodiments, users may share user-created/edited icons 116, 116' among users via social networking, by emails, or between other users from coded message app 120 to app 120'. The coded message app's computer executable instructions 112' are configured to track users use of at least one or more icons 116, 116' and as such is able to identify user's favorite icons 116, 116'. The app's computer executable instructions 112' are further configured for allow users to manipulate a display 128 of the icons, move icons 116, 116' around and to highlight and or otherwise select user's favorite icons 116, 116' in size, boldness and the like as the app 120 keeps track of the user's most-used icons 116, 116', and may highlight those icons 116, 116, and/or may display those icons 116, 116' in a location on the display 128 such that user's favorite icons 116, 116' are easily navigable on the mobile communication displaying means 126.

Figure 2A:
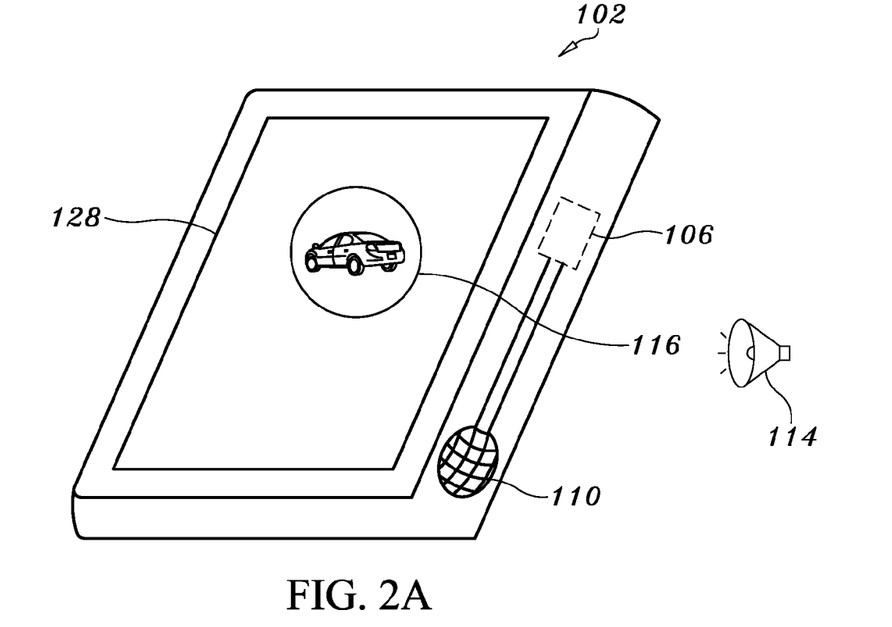
FIGS. 2A & 2B show exemplary embodiments of the coded message application in use according to one embodiment.
Figure 2B:
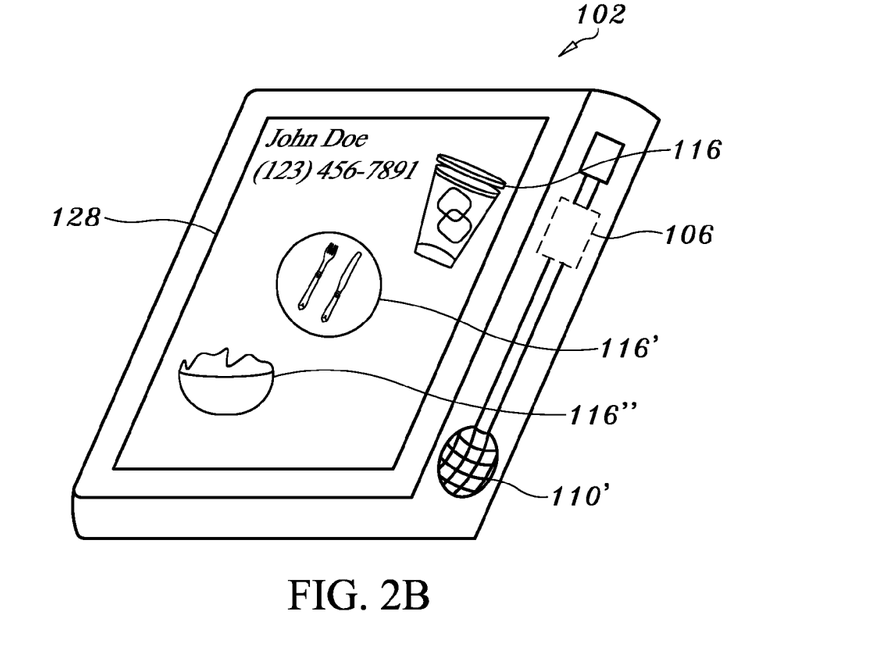

FIGS. 2A & 2B show an exemplary system 100 according to one embodiment of the invention. Mobile communications device 102 comprises of at least one or more sensors 110, 110' positioned within. Sensor 110 includes any one or more of the following: GPS receiver, microphone, accelerometer, compass, inclinometer or other known sensors that are well known and used in the arts as being positioned within mobile communication devices 102, 102' to detect elements 114, 114' of the environment of the user (call recipient) and generate a display 128 of potentially suitable responsive icons 116, 116' representative of possible coded messages 118, 118' for transmission to at least one or more electronic addresses 122, 122'. In an exemplary embodiment, using a plurality of sensors 110, 110', e.g. GPS velocity determination along with microphone detection of road noise the app 120 provides context sensing to detect the at least one element 114 of the user (call recipient) the environment, e.g. user is driving and responsive to the detected element 114, the app 120 generates suggested at least one or more coded message icons 116, 116' for display that may be suitable for transmission. As seen in FIG. 2A, in an exemplary embodiment where the user (call recipient) is driving, responsive to an incoming electronic communication 142, the app's computer executable instructions 112' may be programmed to display the icon 116 for "I'M DRIVING" growing in size and becoming centralized on the displaying means 126 since the elements 114, 114' detected are associated with road noise, acceleration and driving, such that user can initiate the "I'M DRIVING" coded message 118 reply by simply tapping the respective driving icon 116 displayed onscreen.

With an incoming electronic communication 142, e.g. telephone call, the sensors 110, 110' that are in electronic communication with the processor 106 detects at least one or more elements 114 of the user's (call recipient) environment. Processor 106 receives the incoming electronic communication 142 and publishes by text or audio, notification of the incoming electronic communication 142 on a mobile communication device's displaying means 126. In the exemplary embodiment, the incoming electronic communication 142 is published via a display 128 on the mobile communication device's displaying means 126, e.g. by SMS text message or phone number 202 (for incoming voice communications). Processor's computer executable instructions 112 are further configured for communicating the sensed elements 114, 114' to the coded message app's computer executable instructions 112' that are responsible for determining suitable suggested icons 116, 116' corresponding to their respective coded messages 118, 118' for transmission.

In yet another exemplary embodiment, the sensor 110, which includes a microphone may be activated by the processor's computer executable instructions 112 to detect the at least one element 114 of the environment upon the receipt of incoming electronic communication 142. By determining the level of the sensed element 114, e.g. types of sounds (noise) like clinking dishes, and or plurality of voices, a suggested responsive icon 116 may appear for user selection and transmission. If there is ambiguity concerning two or more possible scenarios, at least one or more suggested responsive icons 116, 116' can be generated, e.g. "LET'S HAVE A DRINK", "I'M EATING" or "LUNCH" can be sent to the incoming caller as shown in FIG. 2B. User has the option to select the icon 116 (e.g., by touching a touchscreen, or selecting it using a pointing device, roller ball, arrow keys, or other controller) for transmitting to caller or intended message recipient(s) 138, 138'.

Methods

Figure 3:
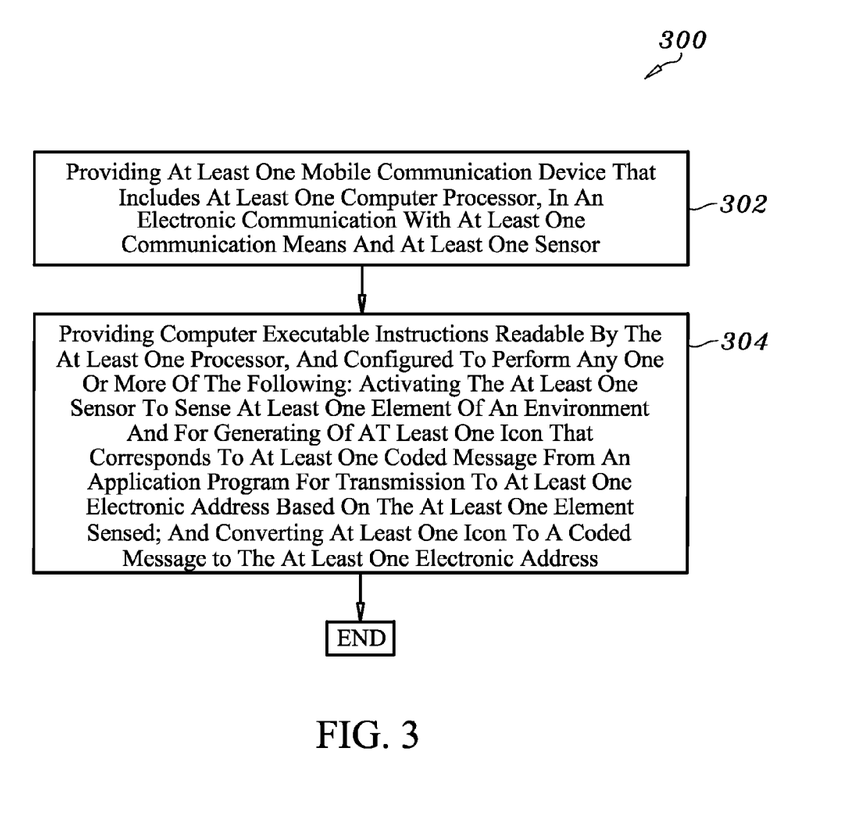
FIG. 3 is a sample flowchart of block diagram of an exemplary method according to one embodiment of the invention.

FIG. 3 is a sample flowchart of a block diagram of an exemplary method 300 according to one embodiment of the invention. Method 300 comprises of: providing at least one mobile communication device 102 that includes at least one computer processor 106, positioned within, in electronic communication with at least one mobile communication device's communication means 108 and at least one sensor 110 (step 302). Mobile communication device 102 may include at least one displaying means 126, which includes but is not limited to: a LCD screen, a LED screen, or a monitor and the like.

As previously discussed, computer processor 106 may be any type of processor, such as, but not limited to, a central processing unit (CPU), a microprocessor, a video processor, a front end processor, a coprocessor, a single-core computer processor, a multi-core processor, and the like. Processor 106 is configured to launch the coded message application 110 for transmitting coded messages 120 to the at least one or more electronic address 122, 122' either automatically upon receipt of a detected incoming electronic communication 142 or via an affirmative selection of an icon 116 on the mobile device's displaying means 126. Sensors 110, 110' such as a GPS receiver, microphone, accelerometer, compass, inclinometer, and the like are used to detect the environment of the user (call recipient) and generate a display 128 of suitable responsive icons 116, 116' representative of potential coded messages 118, 118' for transmission to at least one or more electronic addresses 122, 122'.

Method 300 further comprises of providing computer executable instructions 112 readable by the at least one processor 106, and configured for performing any one or more of the following: activating the at least one sensor 110 to sense at least one element 114 of an environment and for generating publication of at least one icon 116 that corresponds to at least one coded message 118 from the coded message application program 110 for transmission to at least one or more electronic addresses 122, 122' based on the at least one element 114 sensed; and converting a selected at least one icon 116 to a coded message 118 for transmittal of the coded message 118 to the at least one or more electronic addresses 122, 122' (step 304).

The coded message app 120, may comprise in part of a browser, such as for use on the mobile communication device 102, or a similar browsing device to transmit coded messages 118, 118' to one or more electronic addresses 122, 122' to one or a plurality of message recipients 138, 138'. App 120 comprises of computer executable instructions 112 readable by the at least one processor 106, and may be any type of software application, such as a standalone application designed to run on a mobile platform, such as a mobile communication device running an operating system, such as iOS™, Android™, Windows Mobile™, Blackberry™, and the like. Coded message app 120 may be operative for an iPhone, any other "smart phone," mobile communication device, cellular phone, PDA, GPS or any other mobile communication device 102 capable of handling transactions dealing with dynamic content, object, application, or software. In another embodiment, the app 120 may be designed to run on a social network platform, such as FACEBOOK™ or JUSTSYNC™.

Method 300 further comprises of computer executable instructions 112 readable by the at least one processor 106, and configured to perform any one or more of the following: launching the coded message application 120 for transmitting coded messages 118, 118' to at least one or more electronic addresses 122, 122'; and/or receiving and publishing notification of an incoming electronic communication 142 from a sender's electronic address 122 on the mobile communication device's displaying means 126.

In some embodiments, the coded message app's computer executable instructions 112' readable by the at least one processor 106 are configured to perform any one or more of the following: publishing the at least one icon 116 on the mobile communication device's at least one displaying means 126, via the at least one mobile communication device's communication means 108; receiving selection of the at least one icon 116 for transmission to at least one or more electronic addresses 122, 122'; displaying the converted icon's coded message 118 on the at least one displaying means 126; receiving selection of the at least one electronic address 122; transmitting the coded message 118 to the at least one electronic address 122; or displaying confirmation of transmission of the coded message 118. It is understood that mobile device's at least one communications means 108 is configured for accessing a data network 104 and transmitting electronically voice or data communications.

In some embodiments, method 300 further comprises of using computer executable instructions 112 readable by the at least one processor 106, and configured to perform any one or more of the following: sharing at least one or more icons 116, 116' or at least one or more coded messages 118, 118' with another user of the coded message app 120 between app 120 to 120'; tracking user's use of at least one or more icons 116, 116'; or enhancing a display 128 of the at least one icon 116 based on tracked use. Tracking use of the at least one icon 116 further includes monitoring the number of times the at least one icon 116 is used by user, comparing and ranking the number of times the at least one icon 116 is used in comparison to all icons 116, 116' in the user's icon 116 library thereby determining the favorites. Enhancing a display of the at least one icon 118 based on tracked uses may include any one or more of the following: highlighting, enlarging a font size, or changing a font size and the like.

Users may edit the icons 116, 116' or the coded messages 118, 118' and as such method 300 further comprises of the computer executable instructions 112 readable by the computer processor 106 being further configured for performing any one or more of the following: receiving edits to the at least one icon 116 or the at least one coded message 118; displaying a virtual keyboard 130 on the mobile communication device's displaying means 126 comprising of at least one or more icons 116, 116' or alphanumeric characters 132, 132'; or storing at least one edit for at least one icon 116 or the at least one coded message 118; or displaying at least one or more electronic addresses 122, 122' for at least one or more recipients of the at least one coded message 118. The at least one edit includes adding or deleting any one or more of the following: alphanumeric characters 132, 132', pictures or graphical image.

Figure 4:
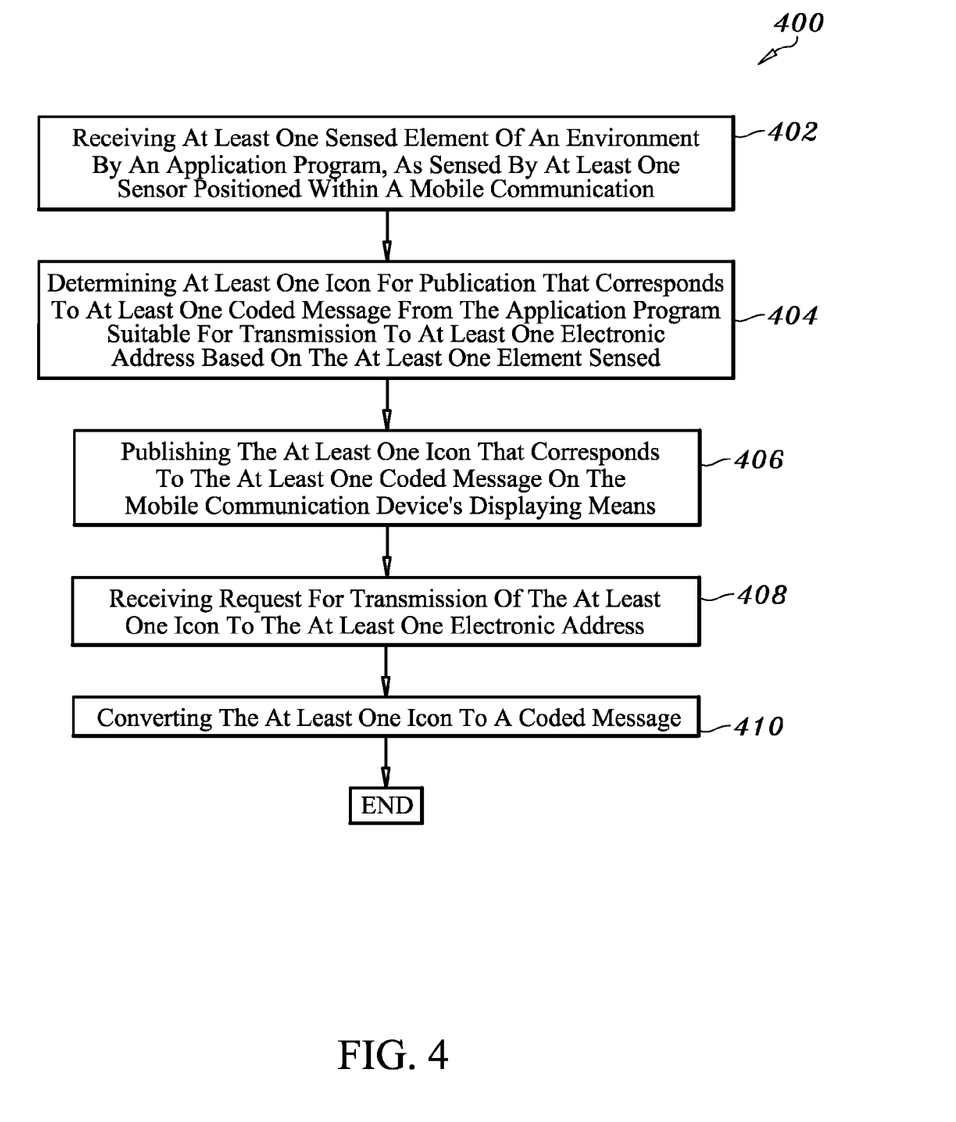
FIG. 4 is a sample flowchart of block diagram of an exemplary method according to one embodiment of the invention.

FIG. 4 describes a sample flowchart of a block diagram of an exemplary method 400 according to one embodiment of the invention. Upon receiving an incoming electronic communication 142, e.g. text or phone call, method 400 comprises of receiving at least one or more sensed elements 114, 114' of an environment by the coded message app 120 as sensed by at least one or more sensors 110, 110' positioned within a mobile communication device 102 (step 402). The app's computer executable instructions 112' are further configured for determining at least one icon 116 for publication on the mobile communication's displaying means 126 that corresponds to at least one coded message 118 from the coded message app 120 suitable for transmission to at least one or more electronic addresses 122, 122' based on the at least one element 114 sensed (step 404). As previously discussed, if for instance the user is driving, the app 120 may determine the driving icon 116 as being suitable for publication based on the elements 114, 114' of the environment that were sensed.

Method 400 further comprises of publishing the at least one or more icons 116, 116' that each corresponds to at least one coded message 118 on the mobile communication device's displaying means 126 (step 406); receiving request for transmission of the at least one icon 116 to the at least one electronic address 122 (step 408). The request for transmission may comprise of a touch on a touch screen display such that the communication means 108 can transmit the coded message 118 to the intended recipient, which may include but is not limited to the original caller. Method 400 further comprises of converting the at least one icon 116 to a coded message 118 (step 410) for transmission to the electronic address(es) 122, 122' for the selected recipients.

In some embodiments, method 400 further comprises of displaying the converted coded message 118 on the mobile communication device's displaying means 126 and transmitting the converted coded message 118 to the at least one electronic address 122 to the message recipients; or activating a display 128 of a virtual keyboard 130 comprising of at least one or more icons 116, 116' on the at least one displaying means 126, wherein the at least one icon 116 corresponds to at least one coded message 118 available for transmission to at least one electronic address 122 for message recipients.

Figure 5:
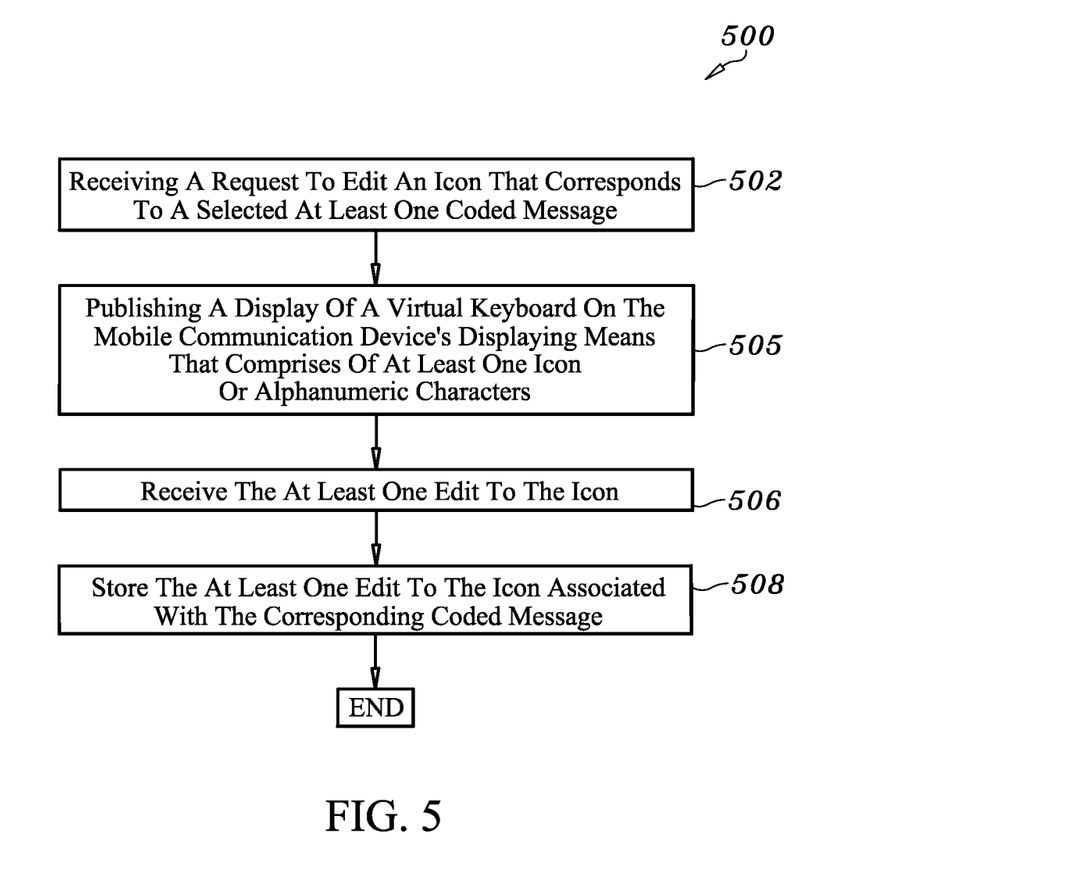
FIG. 5 describes a sample flowchart of a block diagram of an exemplary method of editing a coded message according to one embodiment.

FIG. 5 describes a sample flowchart of a block diagram of an exemplary method 500 of editing at least one icon 116 that corresponds to a coded message 118 according to one embodiment of the invention. In some embodiments, user may modify at least one or more icons 116, 116' associated with each corresponding coded messages 118, 118' when using the app 120.

For example, the app 120 provides for user-customizable icon 116 creation and editing, which may be executed with an external editor where an image may be imported via an in-app icon creator or editor function within the coded message app 120. Images may include but are not limited to user-supplied pictures or graphical images may be supplied by for example a mobile device's camera to snap, shoot and use simple on-board image editing to create an icon in real-time. Once the image is uploaded it may be customized into a custom icon 116. For example, a user may upload an image of a favorite dish and edit the icon 116 representative of coded message for "AT MY FAVE DIVE" to now be represented or displayed by the customized uploaded image, i.e. image of the favorite dish.

In some embodiments, users may share user-created/edited icons 116, 116' among users via social networking, by emails, or between coded message app 120 to app 120. The coded message app's computer executable instructions 112' and configured for allowing users to move icons 116, 116' around and to highlight and or otherwise select user's favorite icons 116, 116' in size, boldness and the like as the app 120 keeps track of the user's most-used icons 116, 116', and may highlights those icons 116, 116, and/or may display those icons 116, 116' in a location on the display 128 in such a manner that the favorite icons 116, 116' are easily navigable on the mobile communication displaying means 126.

The exemplary method 500 comprises of receiving a request to edit an icon 116 that corresponds to a selected at least one coded messages 118 (step 502); publishing a display 128 of a virtual keyboard 130 on the mobile communication device's displaying means 126 that comprises of at least one icon 116 or alphanumeric characters 130, 130' (step 504) such that user may upload a photograph, graphical image or text as an edit to the icon 116 and as such customize the icon 116 to a representative icon 116 of his/her choice. Accordingly, the app's computer executable instructions 112 readable by the at least one processor 106 receives at least one edit to the icon 116 (step 506); and stores the at least one edit to the icon 116 associated with the corresponding coded message 118 (step 508) for future use. Once the edits are completed, user has the option of continuing to edit other icons 116, 116' or other coded messages 118, 118' or to transmit the edited or another icon 116' to one or more electronic addresses 122, 122' for one or a plurality of message recipients.

Figure 6:
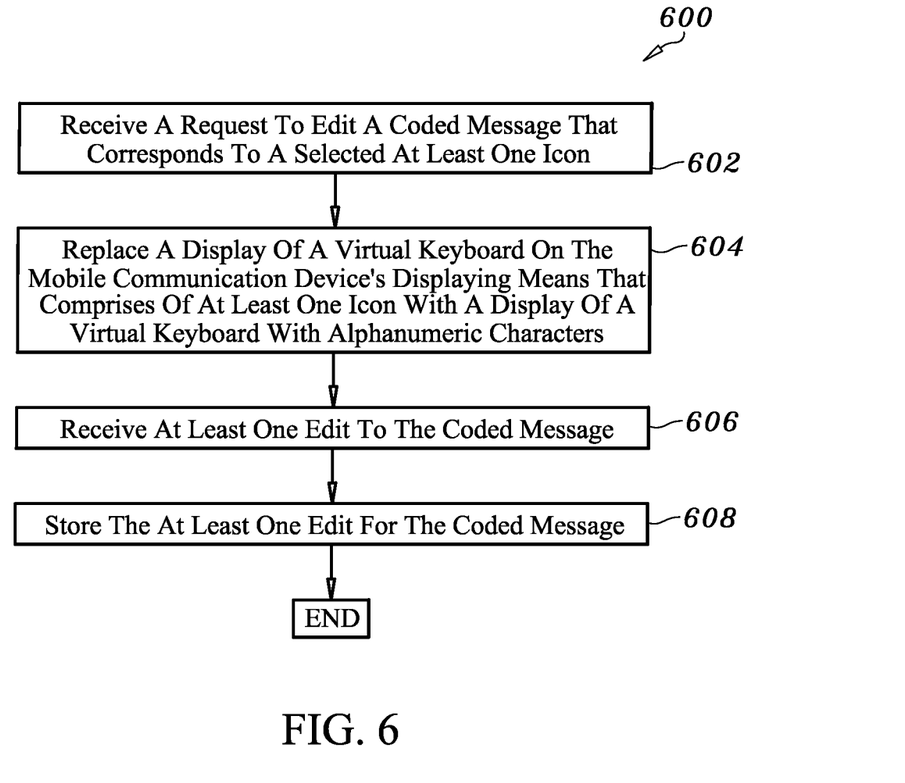
FIG. 6 describes a sample flowchart of a block diagram of an exemplary method of transmitting a coded message according to one embodiment.

FIG. 6 describes a sample flowchart of a block diagram of an exemplary method 600 of editing at least one coded message 118 according to one embodiment. In some embodiments, user may modify one or a plurality of coded messages 118, 118' associated with an icon 116 when using the app 120. The exemplary method 600 comprises of receiving a request to edit a coded message 118 that corresponds to a selected at least one icon 116 (step 602); replacing a display 128 of a virtual keyboard 130 on the mobile communication device's displaying means 126 that comprises of at least one icon 116 with a display of a virtual keyboard 130 with alphanumeric characters 132, 132' (step 604). Once the alphanumeric characters 132, 132' are displayed, user may edit the at least one coded message 118 to a more relevant or personalized description and as such communicate in a language or dialect of his/her choice. Accordingly, the app's computer executable instructions 112 readable by the at least one processor 106 receives at least one edit to the coded message 118 (step 606); and stores the at least one edit for the coded message for future use (step 608). Once the edits are completed, user has the option of continuing to edit or to transmit the edited or another coded message 118 to one or more electronic addresses 122, 122' for one or a plurality of message recipients.

Figure 7:
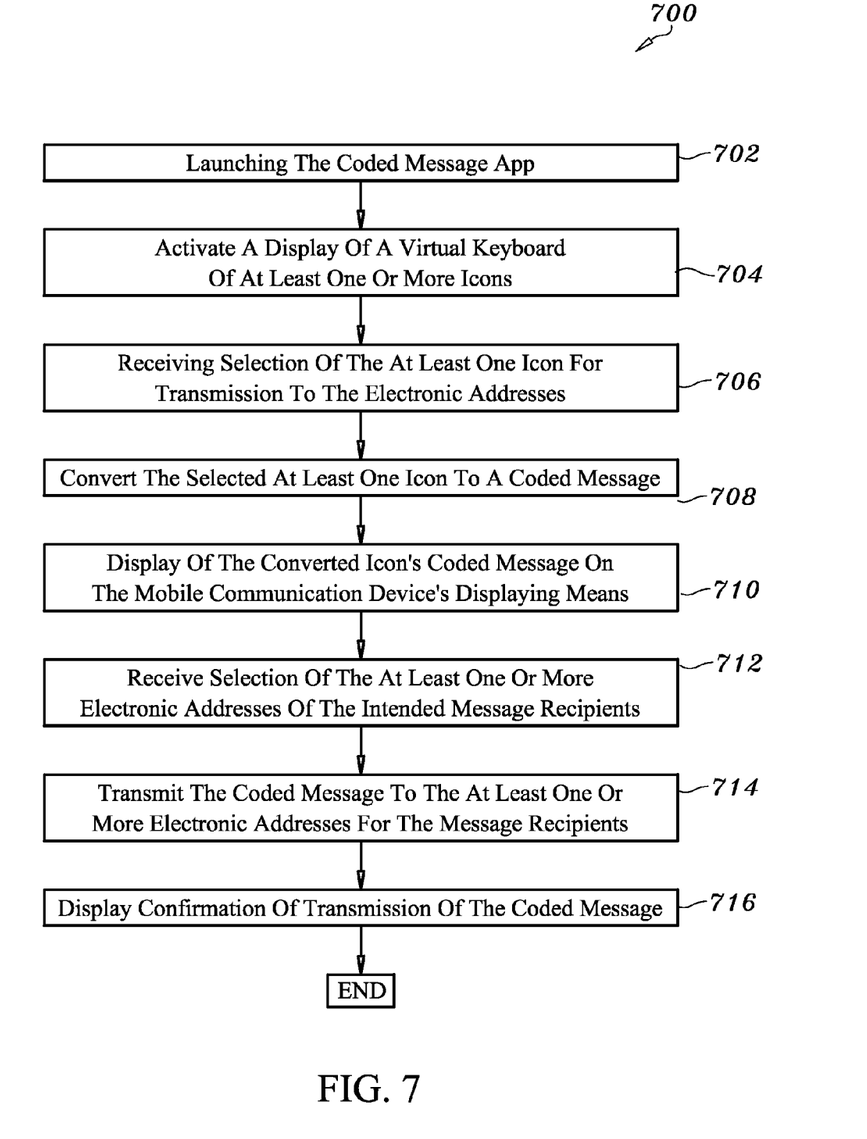
FIG. 7 is a sample flowchart of block diagram of an exemplary method of editing at least one icon according to one embodiment of the invention.

FIG. 7 describes a sample flowchart of a block diagram of an exemplary method 700 of transmitting at least one coded message 118 according to another embodiment. Method 700 comprises of launching the coded message app 120 (step 702) either automatically because of an incoming electronic communication 142 or by a selection by user. In either embodiment, once launched, the app's computer executable instructions 112 readable by the at least one processor 106, is configured for activating a display 128 on the at mobile communication device's at least one displaying means of a virtual keyboard 130, e.g. a touchscreen, comprising of at least one or more icons 116, 116' (step 704) each corresponding to at least one coded message 118 available for transmission to at least one or a plurality of electronic address 122, 122'.

Method 700 further comprises of receiving selection of the at least one icon 116 for transmission to the electronic addresses 122, 122' (step 706); converting the selected at least one icon 116 to a coded message 118 (step 708) e.g. if the user selected the at least one icon 116 representative for coded message 118 "I'm Driving," the icon 116 would be converted and processor 106 causes the display of the converted icon's coded message 118 on the mobile communication device's displaying means 126 (step 710); receiving selection of the at least one or more electronic addresses 122, 122' (step 712) of the intended message recipients; transmitting the coded message 118 to the at least one or more electronic addresses 122, 122' (step 712) for the message recipients; and displaying confirmation of transmission of the coded message 118 (step 714).

Hardware and Operating Environment

This section provides an overview of example hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the methods 300-700 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 8 below.

Figure 8:
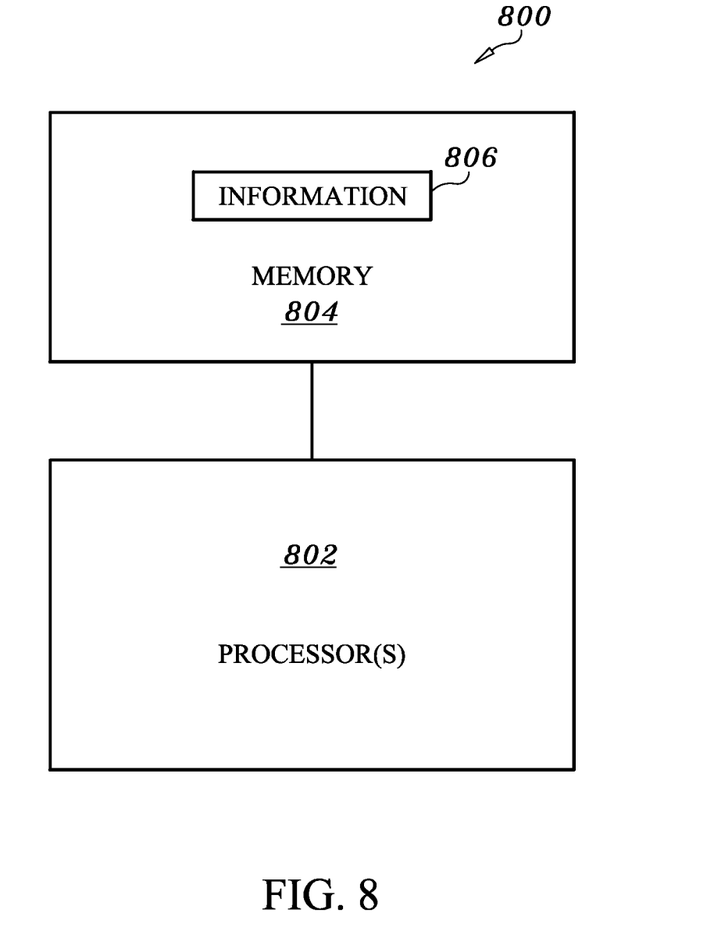
FIG. 8 is a block diagram representing an apparatus according to various embodiments.

FIG. 8 is a block diagram representing an apparatus 700 according to various embodiments. Such embodiments may comprise a computer, a memory system, a magnetic or optical disk, some other storage device, or any type of electronic device or system. The apparatus 800 may include one or more processor(s) 804 coupled to a machine-accessible medium such as a memory 802 (e.g., a memory including electrical, optical, or electromagnetic elements). The medium may contain associated information 804 (e.g., computer program instructions, data, or both) which, when accessed, results in a machine (e.g., the processor(s) 804) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system for transmitting at least one coded message comprising of:
    a. at least one mobile communication device that includes at least one processor and at least one sensor, in electronic communication with at least one communication means positioned within;
    b. computer executable instructions readable by the at least one processor, and configured for performing the following:
       (i) using the at least one sensor to sense at least one element of an environment and to generate publication of at least one icon that represents at least one coded message from an application program for transmission to at least one electronic address responsive to the at least one element sensed from the environment; and
       (ii) converting a selected at least one icon to a coded message for transmittal of the coded message to the at least one electronic address.

2. The system of claim 1, wherein the computer executable instructions readable by the computer processor are further configured for performing any one or more of the following:
    a. launching the application program for transmitting coded messages to the at least one electronic address; or
    b. receiving and publishing notification of an incoming electronic communication from a sender's electronic address on the mobile communication device's displaying means.

3. The system of claim 1, wherein the at least one sensor includes any one or more of the following: global positioning system receiver, microphone, accelerometer, compass, or inclinometer.

4. The system of claim 1, wherein the computer executable instructions readable by the computer processor are further configured for performing any one or more of the following:
    a. sharing the at least one icon or the at least one coded message with another user of the application program; or
    b. tracking use of the at least one icon;
    c. enhancing a display of the at least one icon based on tracked use.

5. The system of claim 4, wherein tracking use of the at least one icon further includes monitoring number of times the at least one icon is used, comparing and ranking the number of times the at least one icon is used.

6. The system of claim 4, wherein enhancing a display of the at least one icon based on tracked use includes highlighting, enlarging a font size, or changing a font size.

7. The system of claim 1, wherein the computer executable instructions readable by the at least one processor are further configured for:
    a. publishing the at least one icon on the mobile communication device's at least one displaying means;
    b. receiving at least one icon for transmission to the at least one electronic address;
    c. displaying a converted coded message on the at least one displaying means;
    d. transmitting the converted coded message to the at least one electronic address; or
    e. displaying confirmation of transmission of the converted coded message.

8. The system of claim 1, wherein the at least one electronic address may include any one or more of the following: name, telephone number, email address and social network electronic identifier.

9. The system of claim 1, wherein the at least one communications means is configured for accessing a data network and transmitting electronically voice or data communications.

10. The system of claim 1, wherein the computer executable instructions readable by the computer processor are further configured for performing any one or more of the following:
    a. receiving edits to the at least one icon or the at least one coded message;
    b. display a virtual keyboard on the mobile communication device's displaying means comprising of at least one icon or alphanumeric characters; or
    c. store at least one edit for at least one icon or the at least one coded message.

11. The system of claim 10, wherein the at least one edit includes but is not limited to: alphanumeric characters, pictures or graphical images.

12. A method comprising of:
    a. providing at least one mobile communication device that includes at least one sensor and at least one computer processor, in electronic communication with at least one communication means positioned within;
    b. providing computer executable instructions readable by the at least one processor, and configured for performing the following:
       i. activating the at least one sensor to sense at least one element of an environment and for generating publication of at least one icon that represents at least one coded message from an application program for transmission to at least one electronic address responsive to the at least one element sensed from the environment; and
       ii. converting at least one icon to a coded message for transmittal of the coded message to the at least one electronic address.

13. The method of claim 12, further comprising providing computer executable instructions readable by the computer processor further configured for performing any one or more of the following:
    a. launching the application program for transmitting coded messages to the at least one electronic address; or
    b. receiving and publishing notification of an incoming electronic communication from a sender's electronic address on the mobile communication device's displaying means.

14. The method of claim 12, wherein the at least one sensor includes any one or more of the following: global positioning system receiver, microphone, accelerometer, compass, or inclinometer.

15. The method of claim 12, wherein the computer executable instructions readable by the at least one processor are further configured for:
   a. publishing the at least one icon on the mobile communication device's at least one displaying means;
   b. receiving at least one icon for transmission to the at least one electronic address;
   c. displaying a converted coded message on the at least one displaying means;
   d. transmitting the converted coded message to the at least one electronic address; or
   e. displaying confirmation of transmission of the converted coded message.

16. The method of claim 12, wherein the computer executable instructions readable by the computer processor are further configured for performing any one or more of the following:
   a. sharing the at least one icon or the at least one coded message with another user of the application program;
   b. tracking use of the at least one icon; or
   c. enhancing a display of the at least one icon based on tracked use.

17. The method of claim 16, wherein tracking use of the at least one icon further includes monitoring number of times the at least one icon is used, comparing and ranking the number of times the at least one icon is used.

18. The method of claim 16, wherein enhancing a display of the at least one icon based on tracked use includes highlighting, enlarging a font size, or changing a font size.

19. The method of claim 12, wherein the at least one electronic address may include any one or more of the following: name, telephone number, email address and social network electronic identifier.

20. The method of claim 12, wherein the at least one communications means is configured for accessing a data network and transmitting electronically voice or data communications.

21. The method of claim 12, wherein the computer executable instructions readable by the computer processor are further configured for performing any one or more of the following:
   (a) receiving edits to the at least one icon or the at least one coded message;
   (b) displaying a virtual keyboard on the mobile communication device's displaying means comprising of at least one icon or alphanumeric characters; or
   (c) storing at least one edit for at least one icon or the at least one coded message.

22. The method of claim 21, wherein the at least one edit includes adding or deleting any one or more of the following: alphanumeric characters, pictures or graphical image.

23. A method comprising of:
   a. receiving at least one sensed element of an environment by an application program, as sensed by at least one sensor positioned within a mobile communication device;
   b. determining at least one icon for publication that represents at least one coded message from the application program suitable for transmission to at least one electronic address responsive to the at least one element sensed from the environment;
   c. publishing the at least one icon that represents the at least one coded message on the mobile communication device's displaying means;
   d. receiving request for transmission of the at least one icon to the at least one electronic address; and
   e. converting the at least one icon to a coded message.

24. The method of claim 23 further comprising displaying the converted coded message on the mobile communication device's displaying means.

25. The method of claim 23 further comprising transmitting the converted coded message to the at least one electronic address for the message recipients.

26. The method of claim 23 further comprising displaying confirmation of transmission of the converted coded message.

27. The method of claim 23 further comprising activating a display of a virtual keyboard comprising of at least one or more icons on the at least one displaying means, wherein the at least one icon represents at least one coded message available for transmission to at least one electronic address.

28. A system of communicating comprising of:
   a. at least one sensor positioned within a mobile communication device;
   b. at least one computer processor in electronic communication with the at least one sensor;
   c. an application program comprising of computer executable instructions executable by the at least one computer processor, configured for performing the following:
   (i) receiving at least one sensed element of an environment, as sensed by the at least one sensor and determining at least one icon for publication that represents at least one coded message from the application program suitable for transmission to at least one electronic address responsive to the at least one element sensed from the environment;
   (ii) publishing the at least one icon on the mobile communication's displaying means that represents the at least one coded message;
   (iii) receiving request for transmission of the at least one icon to the at least one electronic address; and
   (iv) converting the at least one icon to a coded message.

29. The system of claim 28, further comprising of at least one communication means, in electronic communication with the at least one processor, for transmitting the coded message to the at least one electronic address for the message recipients.

30. The system of claim 28, further comprising of displaying means for displaying confirmation of transmission of the coded message.

31. The system of claim 28, further comprising of a virtual keyboard comprising of a plurality of icons that may be displayed on the at least one displaying means.

* * * * *